(12) United States Patent
Ungchusri et al.

(10) Patent No.: US 10,995,863 B2
(45) Date of Patent: May 4, 2021

(54) DUAL FACE-TYPE SEAT SEAL ARRANGEMENT FOR VALVE APPLICATIONS

(71) Applicant: FMC Technologies, Inc., Houston, TX (US)

(72) Inventors: Tep Ungchusri, Conroe, TX (US); Roman Chirko, Tomball, TX (US); Gabriel Tiviroli-Melchert, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 7 days.

(21) Appl. No.: 16/343,493

(22) PCT Filed: Oct. 21, 2016

(86) PCT No.: PCT/US2016/058117
§ 371 (c)(1),
(2) Date: Apr. 19, 2019

(87) PCT Pub. No.: WO2018/075062
PCT Pub. Date: Apr. 26, 2018

(65) Prior Publication Data
US 2019/0264819 A1      Aug. 29, 2019

(51) Int. Cl.
*F16K 3/02*     (2006.01)
*F16K 5/06*     (2006.01)

(52) U.S. Cl.
CPC .......... *F16K 3/0236* (2013.01); *F16K 5/0678* (2013.01); *F16K 5/0689* (2013.01)

(58) Field of Classification Search
CPC ..... F16K 3/0236; F16K 5/0678; F16K 5/0689
See application file for complete search history.

(56) References Cited

U.S. PATENT DOCUMENTS

| | | | |
|---|---|---|---|
| 4,286,614 A | 9/1981 | Kacal et al. | |
| 4,310,163 A | 1/1982 | Pippert | |
| 4,629,161 A | 12/1986 | Jones et al. | |
| 2007/0205561 A1 | 9/2007 | Emoto et al. | |
| 2008/0164437 A1 | 7/2008 | Lam et al. | |
| 2015/0060715 A1 | 3/2015 | Hoang | |
| 2016/0186870 A1 | 6/2016 | Ricard et al. | |

OTHER PUBLICATIONS

International Search Report issued in corresponding International Application No. PCT/US2016/058117 dated Jul. 13, 2017 (3 pages).
Written Opinion issued in corresponding International Application No. PCT/US2016/058117 dated Jul. 13, 2017 (12 pages).
Extended European Search Report issued in corresponding European Application No. 16919564.1, dated May 12, 2020 (8 pages).
Office Action issued in corresponding Canadian Application No. 3,041,232, dated Apr. 22, 2020 (3 pages).

*Primary Examiner* — Marina A Tietjen
(74) *Attorney, Agent, or Firm* — Osha Bergman Watanabe & Burton LLP

(57) ABSTRACT

In one aspect, this disclosure relates to a seat seal assembly for a valve. In another aspect, this disclosure relates to a gate valve or a ball valve including the seat seal assembly. In another aspect, this disclosure relates to a method of manufacturing a valve including the disclosed seat seal assembly.

22 Claims, 8 Drawing Sheets

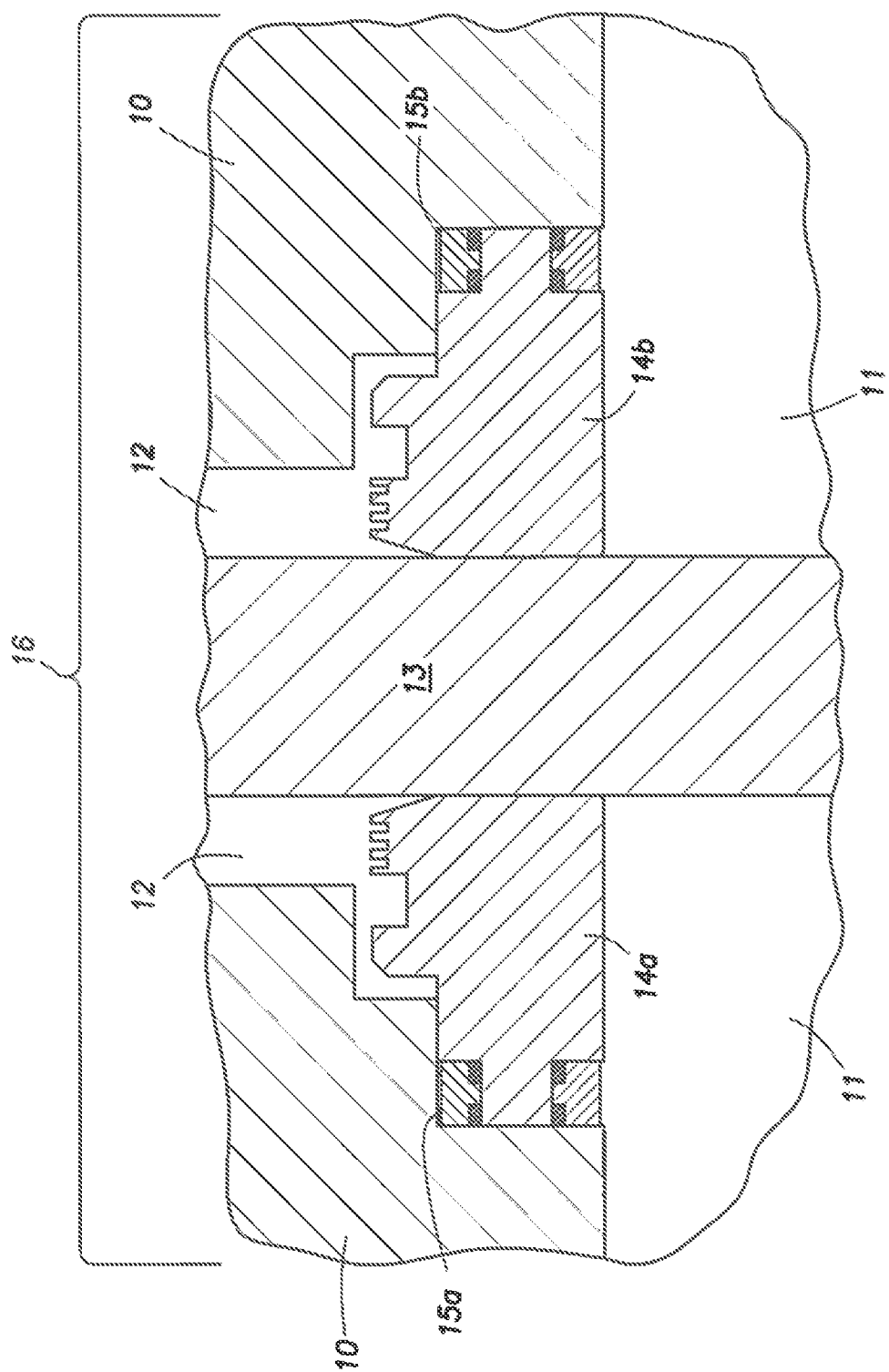

DUAL FACE-TYPE SEAT SEAL ARRANGEMENT FOR VALVE APPLICATIONS

FIELD OF THE DISCLOSURE

Embodiments disclosed herein relate to a valve and a seat assembly for use during high-pressure operations, including hydraulic fracturing.

BACKGROUND

Valves are necessary equipment in industrial applications where pressure and fluid must be controlled. There are many different types of valves available for these applications, each with different characteristics and ideal operating conditions. Two types of valves that are commonly used in high pressure applications are gate valves and ball valves. In hydraulic fracturing and other surface or subsea hydrocarbon production-related operations, for instance, gate valves are commonly selected because they allow the full diameter of the flow bore to be opened, thereby efficiently maximizing flow for a flow bore of a particular diameter. Gate valves are also capable of securely closing against fluid flow, even in high pressure applications. Ball valves have similar advantages.

In certain applications, particularly those in hydrocarbon production-related operations, the valves may be exposed to high pressures, high temperatures or low temperatures, oil, corrosive fluids, and erosive elements such as frac sand or other particulates suspended in fluid, which can damage the valves or cause them to wear down over time. Repairing or replacing a valve can difficult, expensive, and time-consuming, depending on the location of the valve and the need to cease ongoing operations for the repair or replacement. Further, failure of valves in these applications can have catastrophic results.

Typical gate and ball valves include seats disposed on either side of the gate or ball and positioned within seat pockets in a valve body structure to form a seal with the gate or ball on one side and with the valve body on the other side. By forming these seals, the seats are intended to prevent fluid communication between an upstream flow bore and a downstream flow bore of the valve when the valve is closed. Fluid communication between the upstream and downstream flow bores when the valve is closed can result in abnormal pressure drops, damage to components of the valve, and eventually failure of the valve. Maintaining the integrity of the seats is a particular concern in valves that may be exposed to high pressures, high temperatures or low temperatures, oil, corrosive fluids, and erosive elements such as frac sand or other particulates suspended in fluid. The seats are susceptible to damage under these conditions and that damage may make the seats less effective. In particular, the sealing faces of the seats may be eroded or corroded, reducing their ability to form seals with the valve body and the gate or ball.

The seat pockets may also be damaged by extreme operating conditions. The seat pockets may become pitted through corrosion or erosion, causing fluid to leak between the seat pocket and the sealing face of the seat. To repair these leaks, the seat pocket must be machined to remove the pitted surface, forming an "oversized" seat pocket. The oversized seat pocket requires an oversized seat to mate with it. Accordingly, in order to deal with changing sizes of pockets, current seats must be made available in different sizes for valves of a single size. This repair process requires halting valve use and removing the valve, making this process undesirable. Further, the selective fit of the seat introduces complexity and potential for error into the assembly process for a gate valve.

Additionally, in hydraulic fracturing applications, solid elements in the fluid passing through the gate, especially fine mesh sand, build up and become trapped between the seat and the valve body. When this occurs, the sand can cause the seats to lock up with the gate or ball and not float as they are typically designed to. The locked seats can cause gate drag that requires high operating torque to overcome. High operating torque may in turn cause damage to the gate or ball and the seat and place stress on other components of the valve.

SUMMARY OF THE DISCLOSURE

In one aspect, this disclosure relates to a seat seal assembly for a valve. Example seat seal assemblies incorporating aspects of the present disclosure may include an annular seat member with a surface proximal to a flow control element, such as a gate or a ball, a surface distal to the flow control element, an inner surface surrounding the flow bore, and an outer surface. The annular seat member may further include an inner seal pocket proximate the surface distal to the flow control element and at least partially open to the flow bore, and an outer seal pocket proximate the outer surface and the surface distal to the flow control element. The seat seal assembly may further include an inner seal ring disposed at least partially within the inner seal pocket and an outer seal ring disposed at least partially within the outer seal pocket.

In another aspect, this disclosure relates to a valve including the seat assembly described above, the flow control element, and a valve body including a seat pocket surrounding each seat assembly. The gate valve or ball valve may include two seat seal assemblies, one disposed on the upstream side of the flow control element and one disposed on the downstream side of the flow control element.

In another aspect, this disclosure relates to a method of manufacturing a valve including disposing an inner seal ring at least partially within an inner seal pocket of an annular seat member, disposing an outer seal ring at least partially within an outer seal pocket of the annular seat member, and disposing the annular seat member into a valve body such that at least a portion of the inner seal ring contacts the valve body, at least a portion of the outer seal ring contacts the valve body, and at least a portion of the inner seal ring is exposed to a flow bore within the valve body. The method may also include a strategy for manufacturing or retrofitting a gate valve or a ball valve including the seat seal assembly from a ball valve or a gate valve with metal seats.

Other aspects and advantages will be apparent from the following description and the appended claims.

BRIEF DESCRIPTION OF DRAWINGS

FIG. 2a is a cross-section view of a gate valve with seat assemblies in accordance with aspects of the present disclosure.

DETAILED DESCRIPTION

Figure 1:
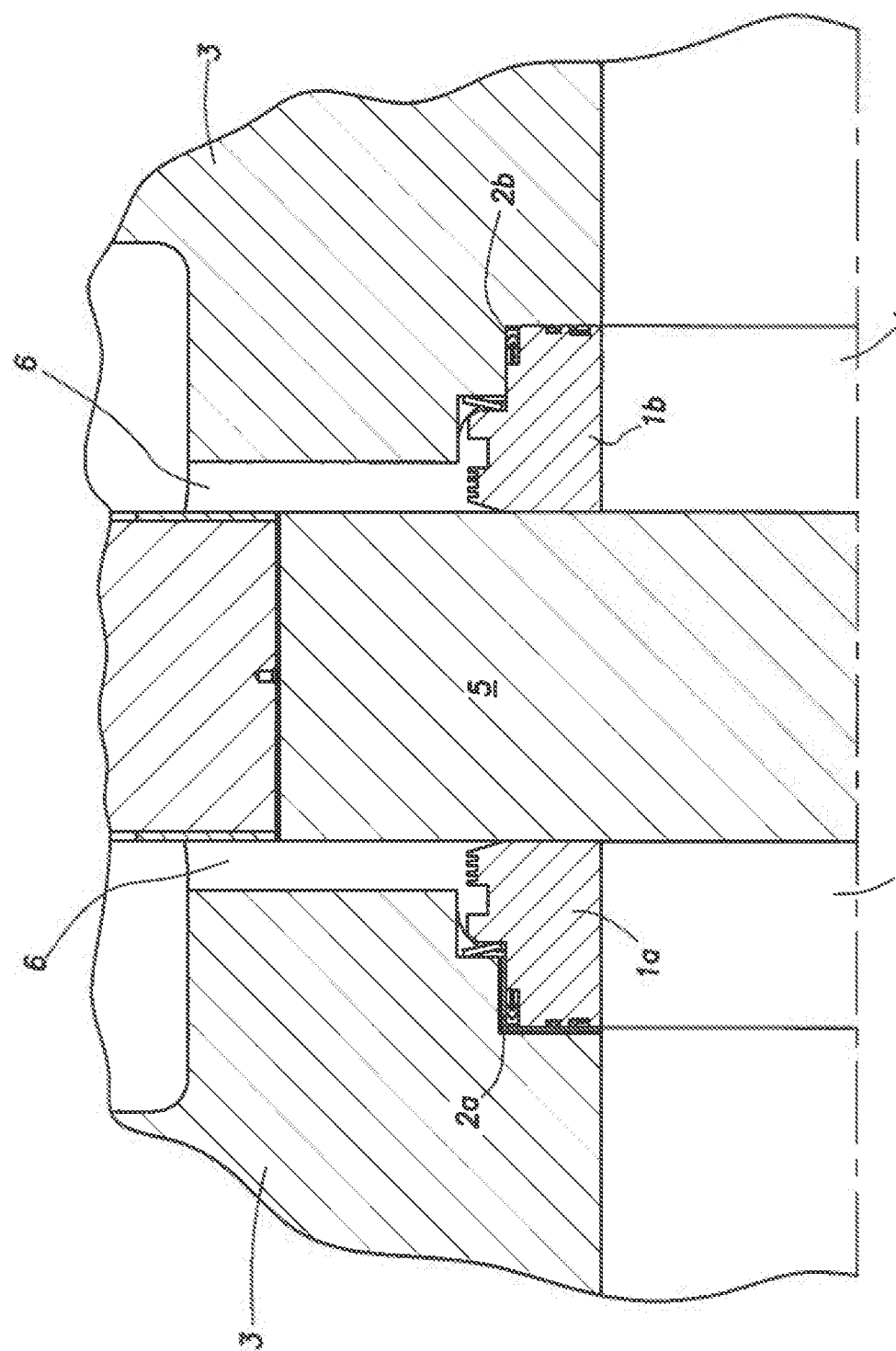
FIG. 1 is a cross-section view of a prior art gate valve.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments disclosed herein generally relate to a seat seal assembly for a valve and a method of manufacturing a valve including a seat seal assembly.

Figure 2B:
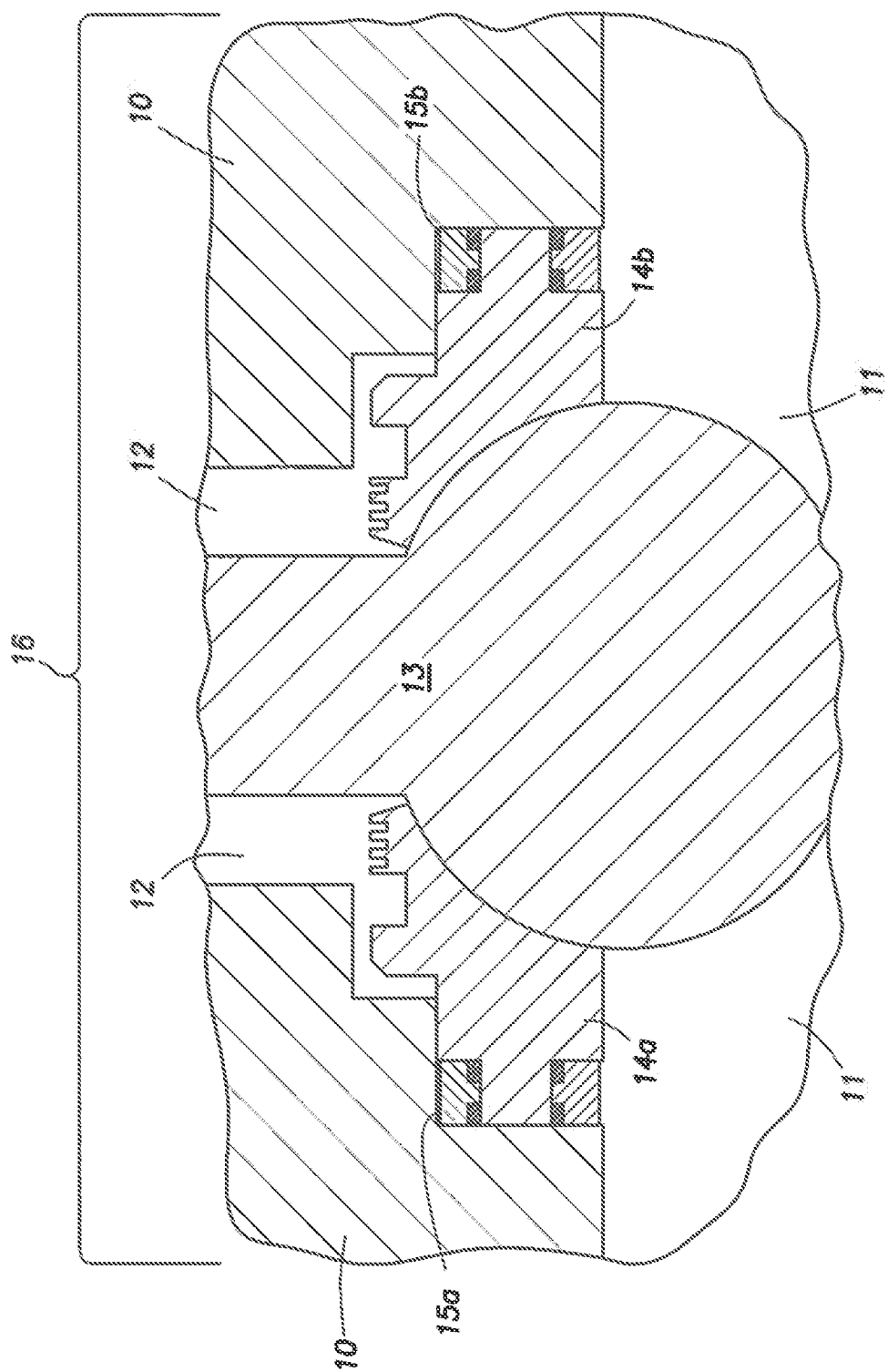
FIG. 2b is a cross-section view of a ball valve with seat assemblies in accordance with aspects of the present disclosure.

FIG. 2a and FIG. 2b show a portion of a valve 16 in accordance with the present disclosure. A valve body 10 surrounds a flow bore 11 and a body cavity 12. Fluid can flow through the flow bore 11 in either direction. A flow control element 13 moves between an open position and a closed position to allow fluid flow through the flow bore 11, to restrict fluid flow, or to halt fluid flow at the valve. The flow control element 13 may be a gate as shown in FIG. 2a or the flow control element 13 may be a ball as shown in FIG. 2b. A gate, as shown in FIG. 2a may move transnationally between an open position within the body cavity 12 and a closed position within the flow bore 11. A ball, as shown in FIG. 2b, may move rotationally within the flow bore 11 between an open position and a closed position. Seat assemblies 14a and 14b may be located on the upstream and downstream sides of the flow control element 13, and may surround the flow bore 11 and form seals with both the flow control element 13 and seat pockets 15a and 15b formed in the valve body 10. These seals may prevent, in part, fluid communication between the upstream and downstream sides of the flow bore 11 through the body cavity 12 when the flow control element 13 is in a closed position.

Figure 3:
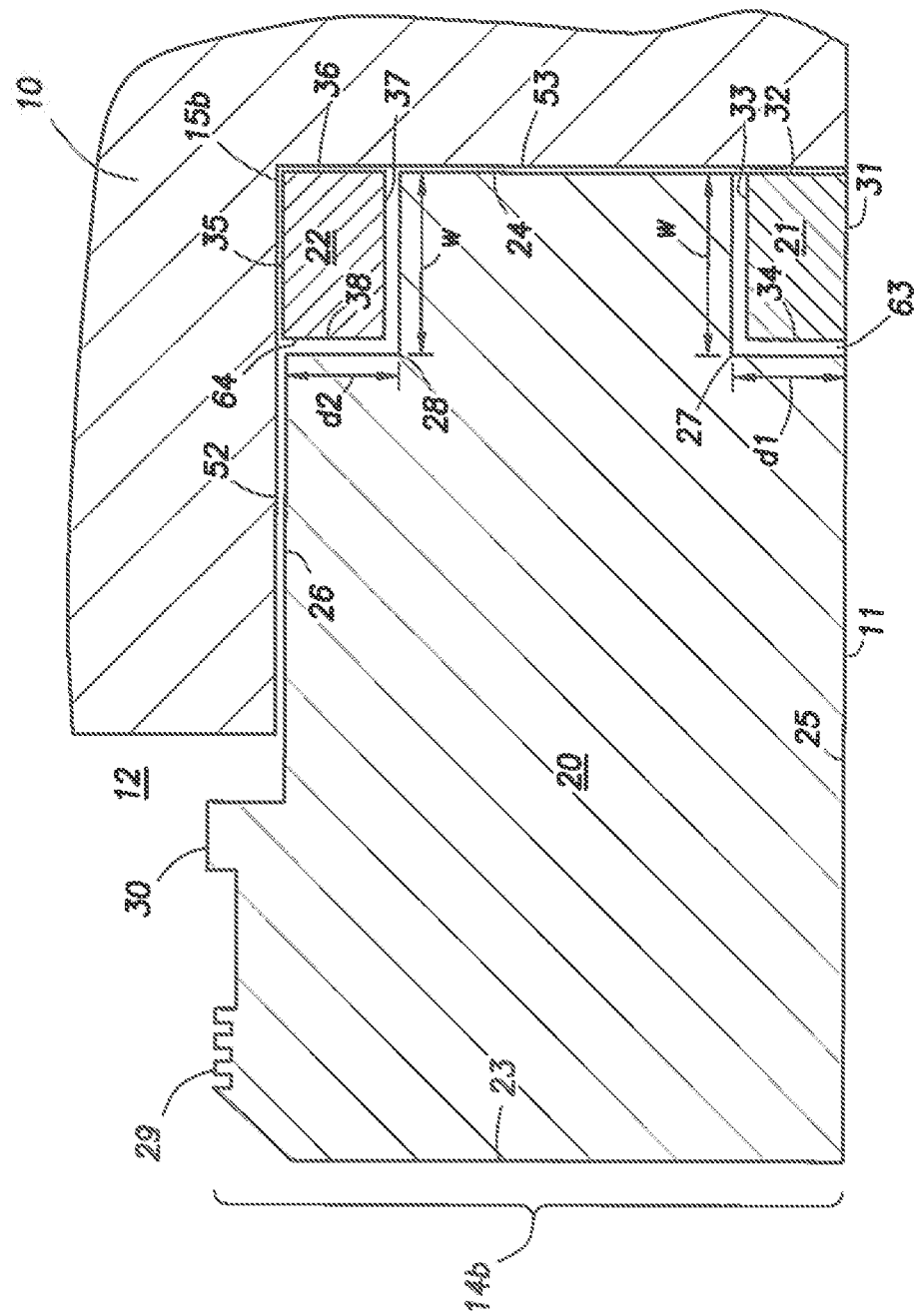
FIG. 3 is a cross-section view of a seat assembly in accordance with aspects of the present disclosure.

Referring now to FIG. 3, a seat assembly 14b is shown in accordance with the present disclosure. The seat assembly 14b includes an annular seat member 20, an inner seal ring 21, and an outer seal ring 22. A proximate face 23 of the annular seat member 20 abuts the flow control element (not shown). A distal face 24 of the annular seat member 20 abuts the axial face 53 of the seat pocket 15b. An inner surface 25 of the annular seat member 20 surrounds the flow bore 11. An outer surface 26 of the annular seat member 20 abuts the radial face 52 of the seat pocket 15b and may extend into the body cavity 12 intermediate the flow control element (not shown) and the body 10.

The seat assembly 14b may comprise a first or inner seal pocket 63 proximate the distal face 24 of the annular seat member 20 and at least partially open to the flow bore 11. As depicted, the inner seal pocket 27 comprises discontinuities or openings in the inner surface 25 and distal face 24 of the annular seat member 20. In the embodiment shown, the inner seal pocket 63 is defined, in part, by an inner shoulder 27 of the annular seat member 20 which may be formed by the discontinuities in the inner surface 25 and the distal face 24 of the annular seat member 20. It should be appreciated that the shape of the inner seal pocket 63 is not limited to the shape depicted herein. In some embodiments, the inner shoulder 27 of the annular seat member 20 may have a depth "d1."

The seat assembly 14b may comprise a second or outer seal pocket 64 proximate the distal face 24 of the annular seat member 20 and at least partially open to a radial face 52 of the seat pocket 15b in the valve body 10. As depicted, the outer seal pocket 28 comprises discontinuities or openings in the outer surface 26 and distal face 24 of the annular seat member 20. In the embodiment shown, the outer seal pocket 64 is defined, in part, by an outer shoulder 28 of the annular seat member 20 which may be formed by the discontinuities in the outer surface 26 and the distal face 24 of the annular seat member 20. In some embodiments, the outer shoulder 28 may have a depth "d2." In some embodiments, depth "d2" may be greater than or similar to depth "d1." In some embodiments, both pockets may have a width, "w." The width of the inner shoulder 27 may or may not be equal to the width of the outer shoulder 28. In some embodiments, the interior and exterior edges of the inner shoulder 27 and outer shoulder 28 and the edge of the proximal face and the inner surface 25 may be radiused.

A seat size indicator 29 may protrude from the outer surface 26 of the annular seat member 20 proximate the proximal face 23 of the annular seat member 20. The seat size indicator 29 indicates the size of the annular seat member 20 for fitting with the seat pocket 15b. A spring catch 30 may protrude from the outer surface 26 of the annular seat member 20 proximate the valve body 10. In certain embodiments, a Belleville spring (not illustrated) may be disposed between the spring catch 30 and the valve body 10.

An inner seal ring 21 is at least partially disposed in inner seal pocket 63 of the annular seat member 20. An inner diameter surface 31 of the inner seal ring 21 surrounds the flow bore 11. The diameter of the inner diameter surface 31 is similar to the diameter of the flow bore 11 and may be slightly larger than the inner diameter of the flow bore 11. A distal face 32 of the inner seal ring 21 abuts the seat pocket 15b. An outer diameter surface 33 and a proximate face 34 of the inner seal ring 21 abut the inner pocket 27 of the annular seat member 20. There may be a small clearance between the outer diameter surface 33 and the annular seat member 20.

In use, the inner seal ring 21 may seal with the annular seat member 20 and with the seat pocket 15b. These seals prevent fluid, and in the case of hydraulic fracturing operations, fine sand, from passing from the flow bore 11 into the body cavity 12 between the distal face 24 of the member 20 and the axial face 53 of the seat pocket 15b. By protecting against sand penetration between the member 20 and seat pocket 15b, the inner seal ring 21 may allow the member 20 to maintain the proper float, so that excessive drag between the member 20 and the flow control element (not shown) may be avoided. This is contrary to typical seat seals in which a portion of the metal seat is not protected against sand penetration, such as if a seal is disposed in a groove on a distal face of the seat assembly away from the flow bore. In those cases, sand may penetrate between the distal face of the seat assembly and the seat pocket before the sealing surface is encountered. The inner seal ring 21 also prevents upstream sealing and protects the seat pocket 15b from erosion by extending the sealing surface to the flow bore 11.

An outer seal ring 22 is at least partially disposed in the outer seal pocket 64 of the annular seat member 20. An outer diameter surface 35 and a distal face 36 of the outer seal ring 22 are adjacent to the seat pocket 15b. There may be a small clearance between the outer diameter surface 35 and the seat pocket. An inner diameter surface 37 and a proximate face 38 of the outer seal ring 22 abut the outer shoulder 28 of the annular seat member 20. There may be a small clearance between the inner diameter surface 37 and the annular seat member 20. When installed in the valve body 10, the outer seal ring 22 forms a seal with the annular seat member 20 and with the seat pocket 15b. This seal prevents fluid from passing from the body cavity 12 into the flow bore 11. The outer seal also prevents body pressure from becoming trapped.

Referring again to FIG. 2a and FIG. 2b, the seat assembly 14a located on the opposite side of the flow control element 13 may be symmetric to the seat assembly 14b described above and may include the same components. Further, the proximate surface 23, which abuts the flow control element 13, may be shaped accordingly, as illustrated in FIGS. 2a and 2b to provide a metal-to-metal seal along the interface of the seat assembly with the flow control element.

Figure 4A:
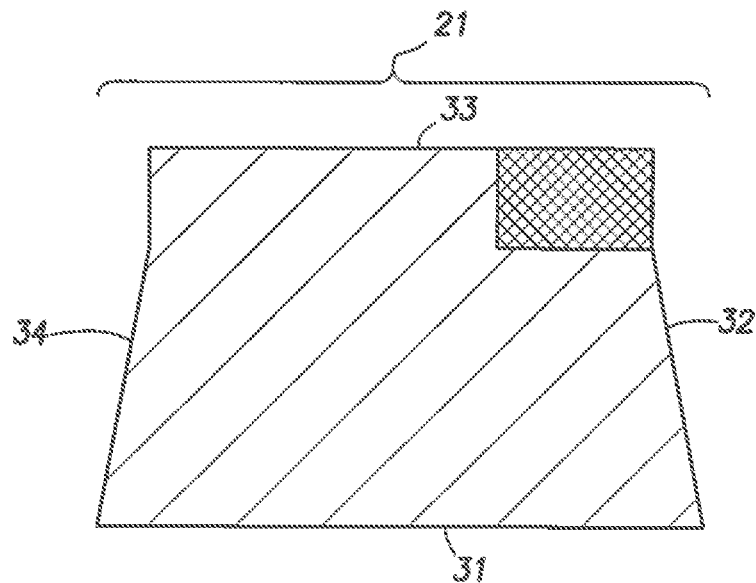
FIG. 4a is a cross-section view of an inner seal ring of a seat assembly in accordance with aspects of the present disclosure.

FIG. 4a shows a cross-section view of an embodiment of the inner seal ring 21. The inner seal ring 21 may be annular in shape and may have a trapezoidal cross section such that the inner diameter surface 31 is wider than the outer diameter surface 33. Such a shape, however, is not required. Instead, the inner seal ring 21 may take any shape such that, when installed in a corresponding seal pocket, a portion of the ring 21 extends beyond the distal face of the seat assembly (not shown) into which ring 21 is at least partially disposed or positioned. This may provide contact between the ring 21 and the seat pocket (not shown) in which the seat assembly (not shown) is disposed such that ring is compressed between the seat assembly (not shown) and the seat pocket (not shown). As depicted, the width of the outer diameter surface 33 may be smaller than or similar to the width of the inner shoulder (not shown) of the annular seat member (not shown) and the width of the inner diameter surface 31 may be greater than or similar to the width of the inner shoulder (not shown) of the annular seat member (not shown).

In some embodiments, the cross section of the inner seal ring 21 may be symmetric. In other embodiments, as shown in FIG. 4a, a portion of the distal face 32 proximate to the outer diameter surface 33 and a portion of the proximate face 34 proximate to the outer diameter surface 33 may be perpendicular to the outer diameter surface 33. The remaining portion of the distal face 32 may be angled outward from the portion of the distal face 32 normal to the outer diameter surface 33 towards the inner diameter surface 31. The remaining portion of the proximate face 34 may be angled outward from the portion of the proximate face 34 normal to the outer diameter surface 33 towards the inner diameter surface 31.

Figure 4B:
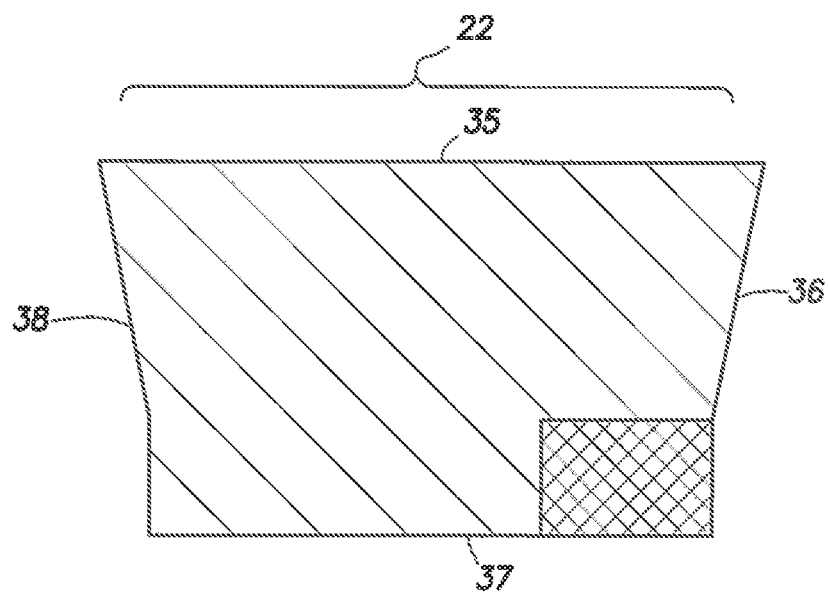
FIG. 4b is a cross-section view of an outer seal ring of a seat assembly in accordance with aspects of the present disclosure.

FIG. 4b shows a cross-section view of the outer seal ring 22. The outer seal 22 is annular in shape and may have a trapezoidal cross section such that the outer diameter surface 35 is wider than the inner diameter surface 37. Such a shape, however, is not required. Instead, the outer seal ring 22 may take any shape such that a portion of the outer seal ring 22 extends beyond the distal face of the seat assembly into which ring 22 is at least partially disposed or positioned. This may provide contact between the ring 22 and the seat pocket (not shown) in which the seat assembly (not shown) is disposed such that ring is compressed between the seat assembly (not shown) and the seat pocket (not shown). As depicted, the width of the inner diameter surface 37 may be similar to or smaller than the width of the outer shoulder (not shown) of the annular seat member (not shown) and the width of the outer diameter surface 35 may be similar to or greater than the width of the outer shoulder (not shown) of the annular seat member (not shown).

In some embodiments, the cross section of the outer seal ring 22 may be symmetric. In other embodiments, as shown in FIG. 4b, a portion of the distal face 36 proximate to the inner diameter surface 37 and a portion of the proximate face 38 proximate to the inner diameter surface 37 may be perpendicular to the inner diameter surface 37. The remaining portion of the distal face 36 may be angled outward from the portion of the distal face 36 normal to the inner diameter surface 37 towards the outer diameter surface 35. The remaining portion of the proximate face 38 may be angled outward from the portion of the proximate face 38 normal to the inner diameter surface 37 towards the outer diameter surface 35.

The cross-section of the inner seal ring and outer seal ring may cause the seals to squeeze the annular seat member against the gate or ball, thus preloading the seal between the annular seat member and the gate or ball and improving the seal at low pressure.

Figure 4C:
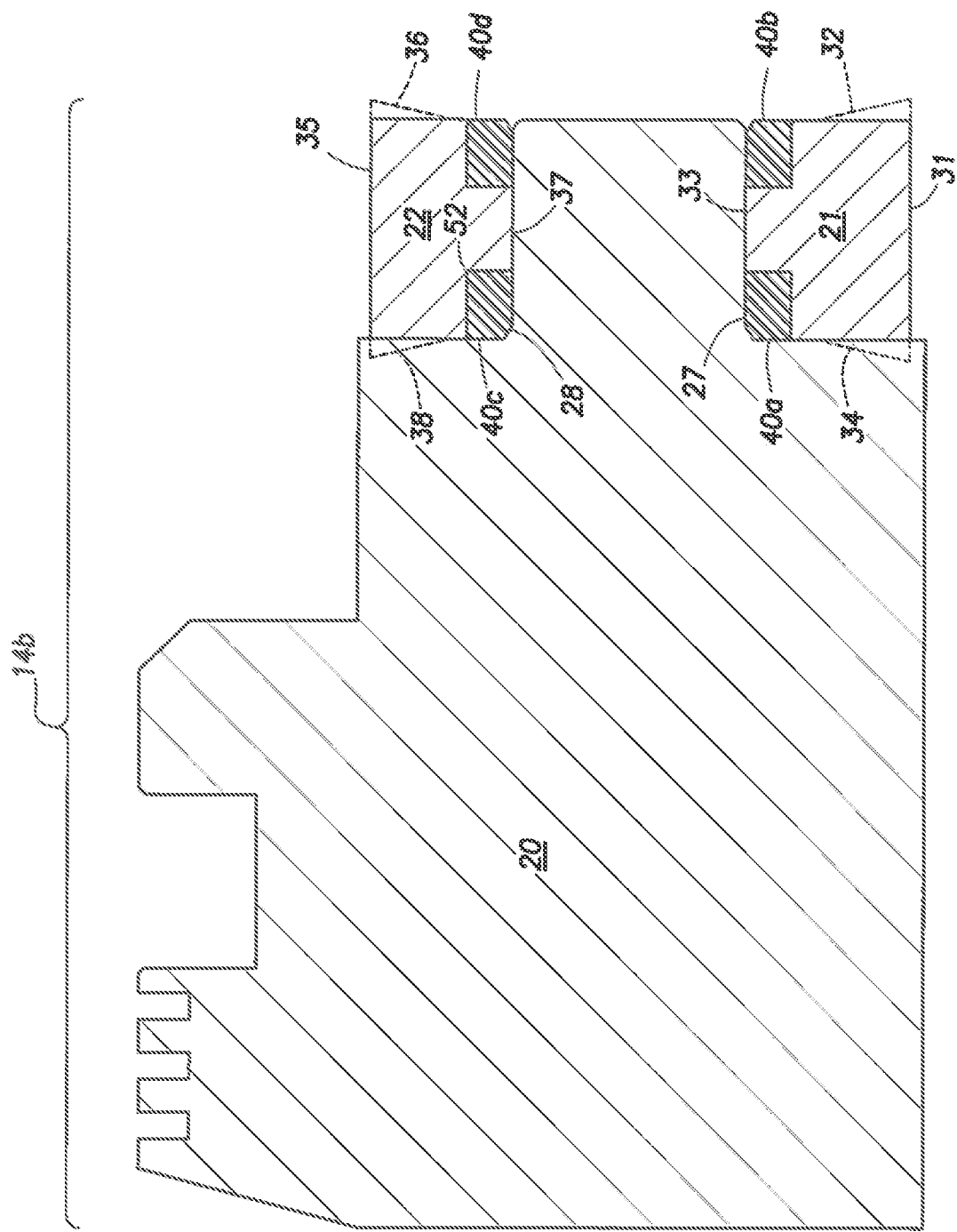
FIG. 4c is a cross-section view of a seat assembly including anti-extrusion rings in accordance with aspects of the present disclosure.

FIG. 4c shows potential locations of optional anti-extrusion rings. Inner seal anti-extrusion rings 40a and 40b may be proximate the outer diameter surface 33 and the distal face 32 and proximate the outer diameter surface 33 and the proximal face 34. Outer seal anti-extrusion rings 40c and 40d may be proximate the inner diameter surface 37 and the distal face 36 and proximate the inner diameter surface 37 and the proximal face 38. Any combination of these rings may be present. If multiple anti-extrusion rings are present, the multiple anti-extrusion rings may or may not have the same height. The inner seal anti-extrusion rings prevent the extrusion of the inner seal ring into the flow bore (not shown), especially when the pressure in the flow bore (not shown) is lower than the pressure in the body cavity (not shown) and when the outer seal may leak. The outer seal anti-extrusion rings prevent the extrusion of the outer seal ring 22 into the body cavity (not shown), especially when the pressure in the body cavity (not shown) is lower than the pressure in the flow bore (not shown).

Anti-extrusion rings may be fabricated integral with the inner seal 21 and the outer seal 22 in some embodiments. In other embodiments, anti-extrusion rings may be disposed on or connected to annular seat member 20. When molded, the inner seal ring 21 and the outer seal ring 22 may include a shoulder "s1" and "s2," respectively, as illustrated in FIG. 4c, allowing the inner seal ring 21 and the outer seal ring 22 to fit properly on the inner shoulder 27 and the outer shoulder 28, respectively. One skilled in the art will recognize that anti-extrusion rings may be manufactured with, connected to, or disposed on the inner seal ring 21, outer seal ring 22, or annular seat member 20 using any method known in the art.

In certain embodiments, the inner seal ring 21 and the outer seal ring 22 may be made of one or more elastomeric materials or compounds. Elastomeric materials and compounds may include hydrogenated nitrile, neoprene, hexafluoropropylene, tetrafluoroethylene, or another fluoroelastomer, for example. An exemplary compound may expand less than 5% by volume when immersed in oil for 70 hours at 212° F., for example. The exemplary compound may have a Bashore rebound of 12-22%, for example. The exemplary compound may have a Shore A durometer of 75-100, for example. The exemplary compound may have a compression set of 15-20% after 70 hours at 212° F., for example. The exemplary compound may be any compound known in the art to be suitable for use in high temperature and pressure environments and for exposure to oil or other hydrocarbons. In certain embodiments, the inner seal ring 21 and the outer seal ring 22 may be made of non-elastomeric materials, including, but not limited to, plastics and any other material capable of performing the sealing function that would be appreciated by one of ordinary skill in the art in view of this disclosure.

Referring again to FIG. 2a and FIG. 2b, the seat assembly, including the inner seal ring 21 and outer seal ring 22, may allow the valve 16 to maintain integrity in corrosive and erosive environments such as those present in downhole operations. For instance, with the inner seal ring 21 positioned at or near the flow bore and between the seat/seat pocket interface and the flow bore, contact between the corrosive and erosive fluids and the seat/seat pocket interface is significantly reduced. Likewise, sand is prevented from entering the seat/seat pocket interface, which reduces the likelihood that the seat will jam against the gate, keeps pressure from becoming trapped in cavities created by the trapped particulates between the seat and the seat pocket, and also prevents the particulates from eroding the seat pocket, eliminating the necessity of over machining the seat pocket to remove pits and then using a selective fit for the seat assembly. In certain embodiments, seat assemblies described herein may also be beneficial when retrofitting or repairing existing valves with eroded or pitted seat pockets, where seals rings 21 and 22 can be made from pliable materials such as elastomer that can provide sufficient sealing with the pitted seat pockets, eliminating the need to machine the valve assembly to smooth the pocket.

Figure 5:
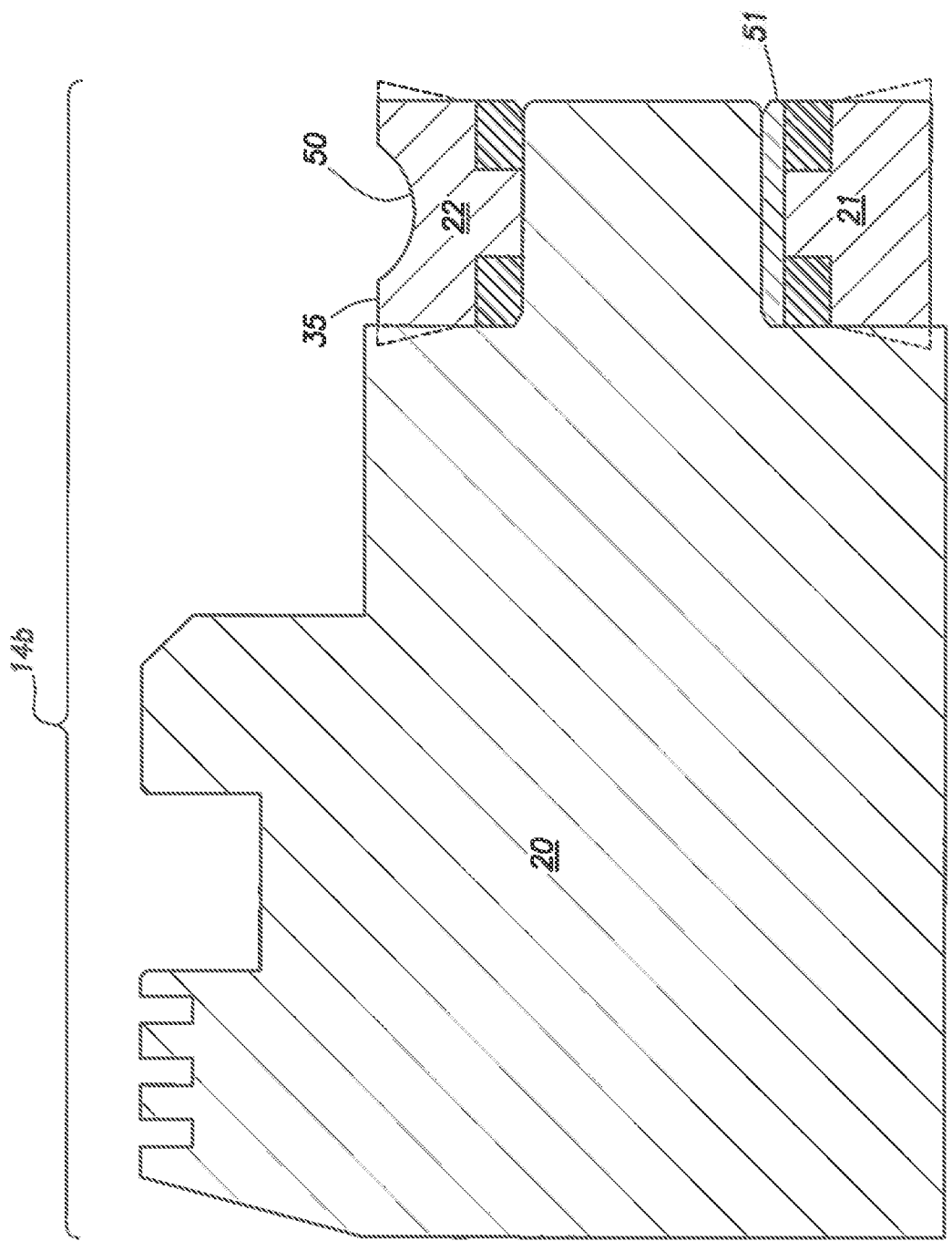
FIG. 5 is a cross-section view of a seat assembly with a metal ring and an outer seal groove in accordance with aspects of the present disclosure.

FIG. 5 shows a seat assembly 14b with optional features. A groove 50 may be formed in the outer diameter surface 35 of the outer seal ring 22. The groove 50 prevents the annular seat member 20 from sealing to the flow control member (not shown) upstream if inner seal ring 21 leaks. Upstream sealing causes gate drag, increasing the time necessary to move the flow control member from an open position to a closed position and vice versa, for example the time necessary to raise or lower a gate or to rotate a ball from an open configuration to a closed configuration. This increases the time that the flow control member spends in a partially open position, the position in which the flow control member is most susceptible to pitting in corrosive or erosive environments. Pitting can prevent the flow control member from sealing properly to the seat assembly. If the flow control member is a gate, the lower portion of the gate may be particularly susceptible to pitting. A metal ring 51 may be located between the inner seal ring 21 and the annular seat member 20. The metal ring 51 allows the cross-section height of the inner seal ring to be smaller.

Figure 6A:
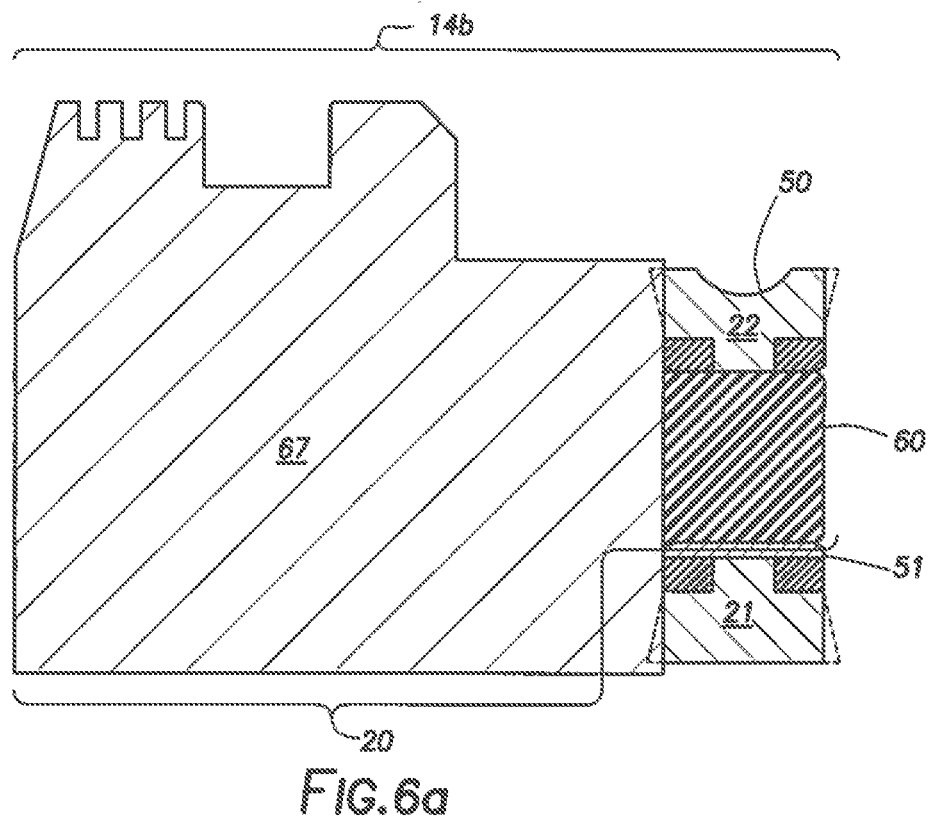
FIG. 6a is a cross-section view of a seat assembly with an annular packing gland in accordance with aspects of the present disclosure.

Another embodiment of a seat assembly 14b is illustrated in FIG. 6a. FIG. 6a shows a seat assembly that includes an annular packing gland 60 in lieu of the metal of the annular seat member 20 between inner pocket 27 and outer pocket 28. The distal side of the annular seat member 20 is truncated proximate the inner seal ring 21 and the outer seal ring 22 to form an annular metal component 67. The annular packing gland 60 abuts the annular metal component 67 and is located between the inner seal ring 21 and the outer seal ring 22. There may be a small clearance between the annular packing gland 60 and the inner seal ring 21. There may also be a small clearance between the annular packing gland 60 and the outer seal ring 22. The clearances may or may not be the same size.

Figure 6B:
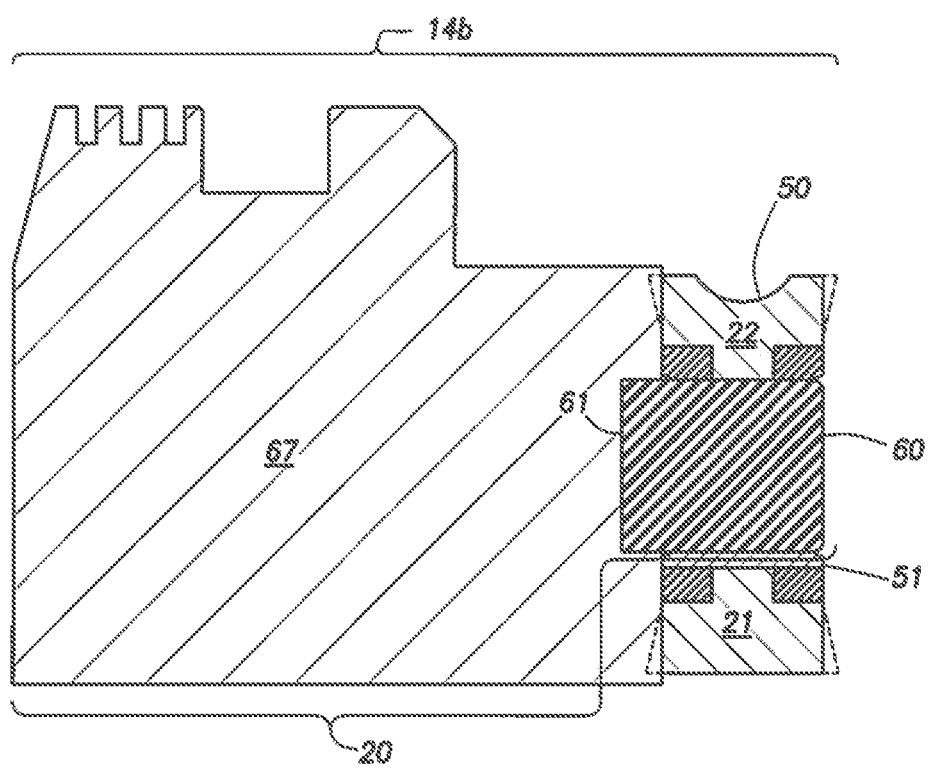
FIG. 6b is a cross-section view of a seat assembly with an annular packing gland secured by a groove in accordance with aspects of the present disclosure.

FIG. 6b shows another configuration for a seat assembly 14b including the annular packing gland 60. A groove 61 is cut into the annular metal component 67 formed by truncating the annular seat member 20. The groove 61 is cut into the side of the annular metal component 67 proximate the packing gland 60. The annular packing gland 60 extends into the groove 61. In some embodiments, the groove 61 may be annular. In other embodiments, the groove 61 may consist of multiple cavities located radially around the truncated side of the annular metal component 67. In such an embodiment, the annular packing gland 60 will have multiple protrusions corresponding to the groove cavities on the annular metal component 67. There may be a small clearance between the annular packing gland 60 and the inner seal ring 21. There may also be a small clearance between the annular packing gland 60 and the outer seal ring 22. The clearances may or may not be the same size. FIG. 6a and FIG. 6b show the optional groove 50 and metal ring 51 shown in FIG. 5. One skilled in the art will recognize that a seat assembly including an annular packing gland 60 may or may not include these features.

A valve including one or more seat assemblies as disclosed herein may be used in drilling operations. The valve may be installed above ground, below ground, or subsea. Any fluid needed for the drilling operation may be pumped or flowed through the valve. In hydraulic fracturing operations, fluid in which frac or sand or other particulate matter is suspended may be pumped or flowed through the valve. The valve may be placed in a fully open position to allow the fluid being flowed or pumped to pass the valve. If the valve is a gate valve, the fully open position comprises the flow control element being disposed mostly or completely within the body cavity. If the valve is a ball valve, the fully open position may comprise the flow control element being rotated such that the flow control element does not obstruct the flow bore (a bore through the ball is exposed to the flow bore and allows flow through the valve). The valve may also be placed in a fully closed position in which the flow control element completely obstructs the flow bore. The flow control element may seal with the seat assemblies in the fully closed configuration, preventing the fluid being flowed or pumped from passing the valve. The movement of the flow control element between the fully open and the fully closed positions may be controlled to facilitate fracturing or other drilling operations. The movement of the flow control element between the fully open and the fully closed positions may be informed by the pressure throughout the drilling operation. The flow control element, as described above, may be a ball or a gate.

One skilled in the art will recognize that embodiments of the present disclosure present several advantages, especially over valve seat assemblies with different seal placements that do not protect the entire seat/seat pocket interface and allow fluid and particulates to penetrate the seat/seat pocket interface, potentially causing erosion and corrosion in the form of pitting that may cause the seal and valve to fail entirely. In certain embodiments, the use of elastomeric materials in the seals may make the seat assembly more robust, allowing the seals to seal more strongly to the seat pockets even when the seat pockets may be pitted from use in a corrosive or erosive environment.

In addition, seat assemblies incorporating aspects of the present disclosure may reduce drag between the seat assemblies and flow control members. As described above, by limiting the flow of fluid and particulates into seat/seat pocket interface, the build-up of particulates in the interface may be reduced, limiting the chance that the seat assembly with lock with the flow control member. Additionally, the inner seal ring may prevent upstream sealing from occurring, and the outer seal ring may prevent body pressure from becoming trapped. All three of these circumstances can lead to drag which makes the gate more difficult to raise and lower or the ball more difficult to rotate. Drag increases the amount of time that the flow control element is in a partially open position, the position in which the flow control element is most susceptible to pitting in corrosive or erosive environments. Pitting can, for example, prevent the gate, especially the lower portion of the gate, from sealing properly to the seat assembly. Drag also increases the stress placed on the flow control element, the seat assembly, and the mechanism used to raise and lower the gate or to rotate the ball. Therefore, the present disclosure may extend the lifespan of gate valves or ball valves, particularly those used in high pressure and corrosive or erosive environments. The present disclosure may also eliminate the need for over machining the seat pocket of the valves to remove pits on the sealing surface. This, in turn, may eliminate the need for using seat assemblies with selective fit, reducing the chance for assembly errors and subsequent valve failure. Further, in certain embodiments, the inner seal ring and outer seal ring may apply preload to the flow control element, which may make the seat seal assemblies suitable for use at low pressures.

This present disclosure also relates to a method of assembling a valve as shown in FIG. 2a or FIG. 2b including the seat assembly described above and shown in FIG. 3. In the simplest embodiment, the method comprises assembling a seat assembly 14b by disposing an inner seal ring 21 at least partially within an inner seal pocket 63 of an annular seat member 20 and disposing an outer seal ring 22 at least partially within an outer seal pocket 64 of the annular seat member 20 and disposing the annular seat member 20 into a valve body 10 such that at least a portion of the inner seal ring 21 contacts the valve body 10, at least a portion of the outer seal ring 22 contacts the valve body 10, and at least a portion of the inner seal ring 21 is exposed to a flow bore 11 within the valve body 10.

A ball valve or a gate valve including the seat assembly described above may also be assembled from a previously used valve with metal-to-metal seals, such as the gate valve shown in FIG. 1. The metal seals 1a and 1b may be removed from the external body 3 before the seat assembly 14b described above and shown in FIG. 3 is disposed within the external body. The metal seals shown in FIG. 1 may also be modified to form the annular seat member 20 shown in FIG. 3. After the metal seals 1a and 1b are removed from the gate valve, the metal seals 1a and 1b may be modified, such as by machining the metal seals 1a and 1b to include an inner shoulder 27 and an outer shoulder 28. In this way, the metal seals 1a and 1b can be transformed into annular seat members 20 suitable for use in the seat seal assembly described herein. Inner seal 21 and outer seal 22 are disposed on the inner shoulder 27 and the outer shoulder 28 of the annular seat member 20 made from the seat seal. In this way, a valve with a metal-to-metal seat seal may be made into a valve with a seat assembly having a metal to elastomer seal.

Optional elements including the anti-extrusion rings 40a-40d, the metal ring 51, the outer seal groove 50, and the annular packing gland 60 described above may be disposed in the seat assembly following the method described herein. If the annular packing gland 60 as shown in FIG. 6a is included, the seat assembly may be assembled from a previously used gate valve with metal-to-metal seals as shown in FIG. 1. The distal side of the seat seal is truncated to form the annular metal component 67 and an annular packing gland 60 is disposed next to it. An inner seal 21 is disposed on the inner diameter of the annular packing gland 60 and an outer seal 22 is disposed on the outer diameter of the annular packing gland 60. A groove 61 may be made in the distal side of the annular packing gland 60 made from the seat seal as shown in FIG. 6b.

The flow control element described herein may be a ball or a gate. The embodiments of seat assemblies described herein may be part of a gate valve or a ball valve. Optional features shown in FIG. 4c, FIG. 5, and FIG. 6 may be included in a gate valve or a ball valve, the primary difference of the seal assemblies being the configuration of the surface contacting the flow control element.

One skilled in the art will recognize that the method described herein presents several benefits. The method enables the manufacture of gate valves and ball valves robust to damage from frac sand and other particulates and corrosive materials. The method further enables seat assemblies with elastomeric seals to be created from metal seat seals. In this way, valves may be retrofitted with the improved seat assemblies with minimal cost. The improved seat seal assemblies may be incorporated into an existing valve during standard maintenance, further reducing the cost of retrofitting by minimizing the amount of time that the gate valve is not in use. The disclosed method also allows components of existing valves that fit with the operation systems in which the valve is used to continue to be used. In this way, the performance of frac valves may be improved easily and inexpensively.

The valve seat seal assembly and the method for manufacture described herein may be used in wellbore operations. The valve seat seal assembly is especially advantageous for fracture drilling and other operations in which frac sand, other particulates, or corrosive materials may be pumped through the valve. The seat seal assembly may also be used in subsea wellbore operations. The seat seal assembly may further be used in applications not related to wellbore operations such as water and chemical processing and manufacturing. The seat seal assembly is robust against erosion and corrosion, making it ideal for any application in which particulates or corrosive materials are pumped through a gate valve or a ball valve.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. A seat assembly for a valve having a flow control element movable between valve closed and valve open positions, comprising:

a. an annular seat member, comprising:
  i. a surface proximal to the flow control element,
  ii. a surface distal to the flow control element,
  iii. an inner surface surrounding a flow bore,
  iv. an outer surface,
  v. an inner seal pocket proximate the surface distal to the flow control element, wherein the inner seal pocket is completely open to the flow bore, and
  vi. an outer seal pocket proximate the outer surface and the surface distal to the flow control element,
b. an inner seal ring disposed at least partially within the inner seal pocket, and
c. an outer seal ring disposed at least partially within the outer seal pocket.

2. The seat assembly of claim 1, wherein the inner seal ring and the outer seal ring comprise an elastomeric material.

3. The seat assembly of claim 1, wherein at least one of the inner seal ring and the outer seal ring extends at least partially beyond the surface of the annular seat member distal to the flow control element.

4. The seat assembly of claim 1, further comprising one or more anti-extrusion rings disposed proximate an outer diameter of the inner seal ring.

5. The seat assembly of claim 1, further comprising one or more anti-extrusion rings disposed proximate an inner diameter of the outer seal ring.

6. The seat assembly of claim 1, wherein an outer diameter surface of the outer seal ring includes a groove.

7. The seat assembly of claim 1, further comprising a metal ring located between the inner seal ring and the annular seat member.

8. The seat assembly of claim 1, wherein the annular seat member further comprises an annular metal component and an annular packing gland disposed between the inner seal ring and outer seal ring, abutting the annular metal component, at least partially forming the inner seal pocket and the outer seal pocket.

9. The seat assembly of claim 8, wherein the annular metal component and the annular packing gland fit together with a complementary groove and protrusion.

10. The seat assembly of claim 1, wherein the flow control element comprises one of a gate and a ball.

11. The seat assembly of claim 1, wherein the inner seal pocket is defined by an inner shoulder of the annular seat member proximate the inner surface and the distal surface of the annular seat member.

12. A valve comprising:
a. one or more seat assemblies comprising:
  i. an annular seat member, comprising:
    1. a surface proximal to a flow control element movable between an open position and a closed position,
    2. a surface distal to the flow control element,
    3. an inner surface surrounding a flow bore,
    4. an outer surface,
    5. an inner seal pocket proximate the surface distal to the flow control element, wherein the inner seal pocket is completely open to the flow bore, and
    6. an outer seal pocket proximate the outer diameter and the surface distal to the flow control element,
  ii. an inner seal ring disposed at least partially within the inner seal pocket,
  iii. an outer seal ring disposed at least partially within the outer seal pocket;
b. a valve body comprising an annular seat pocket surrounding each seat assembly; and
c. the flow control element.

13. The valve of claim 12, wherein a clearance is formed between the annular seat pocket and the outer seal ring.

14. The valve of claim 12, comprising two seat assemblies disposed within the seat pockets of the valve body, one seat assembly on an upstream side of the flow control element, one seat assembly on a downstream side of the flow control element.

15. A method of assembling a valve comprising:
a. disposing an inner seal ring at least partially within an inner seal pocket of an annular seat member;
b. disposing an outer seal ring at least partially within an outer seal pocket of the annular seat member, and
c. disposing the annular seat member into a valve body such that at least a portion of the inner seal ring contacts the valve body, at least a portion of the outer seal ring contacts the valve body, and at least a portion of the inner seal ring is exposed to a flow bore within the valve body,
wherein the inner seal pocket is completely open to the flow bore.

16. The method of claim 15, further comprising removing a previously used seat seal from the valve body before disposing the annular seat member into it.

17. The method of claim 15, further comprising creating the annular seat member from a previously used seat seal by forming an inner shoulder corresponding to the inner seal pocket and an outer shoulder corresponding to the outer seal pocket into the previously used seat seal.

18. The method of claim 15, wherein disposing the outer seal ring at least partially within the outer seal pocket comprises positioning one or more anti-extrusion rings of the outer seal ring against the annular seat member.

19. The method of claim 15, wherein disposing the inner seal ring at least partially within the inner seal pocket comprises positioning one or more anti-extrusion rings of the inner seal ring against the annular seat member.

20. The method of claim 15, further comprising creating the annular seat member from a previously used seat seal by truncating a distal side of the previously used seat seal to form an annular metal component and assembling a seat assembly by disposing an annular packing gland proximate the annular metal component, disposing the inner seal ring on an inner surface of the annular packing gland, and disposing the outer seal ring on an outer surface of the annular packing gland.

21. The method of claim 15, further comprising disposing a metal ring between the inner seal ring and the annular seat member.

22. The method of claim 15, further comprising forming the annular seat member from an annular metal component and an annular packing gland, by disposing the annular packing gland between the inner seal ring and outer seal ring, abutting the annular metal component, forming an inner shoulder and an outer shoulder.

* * * * *